Patented July 4, 1950

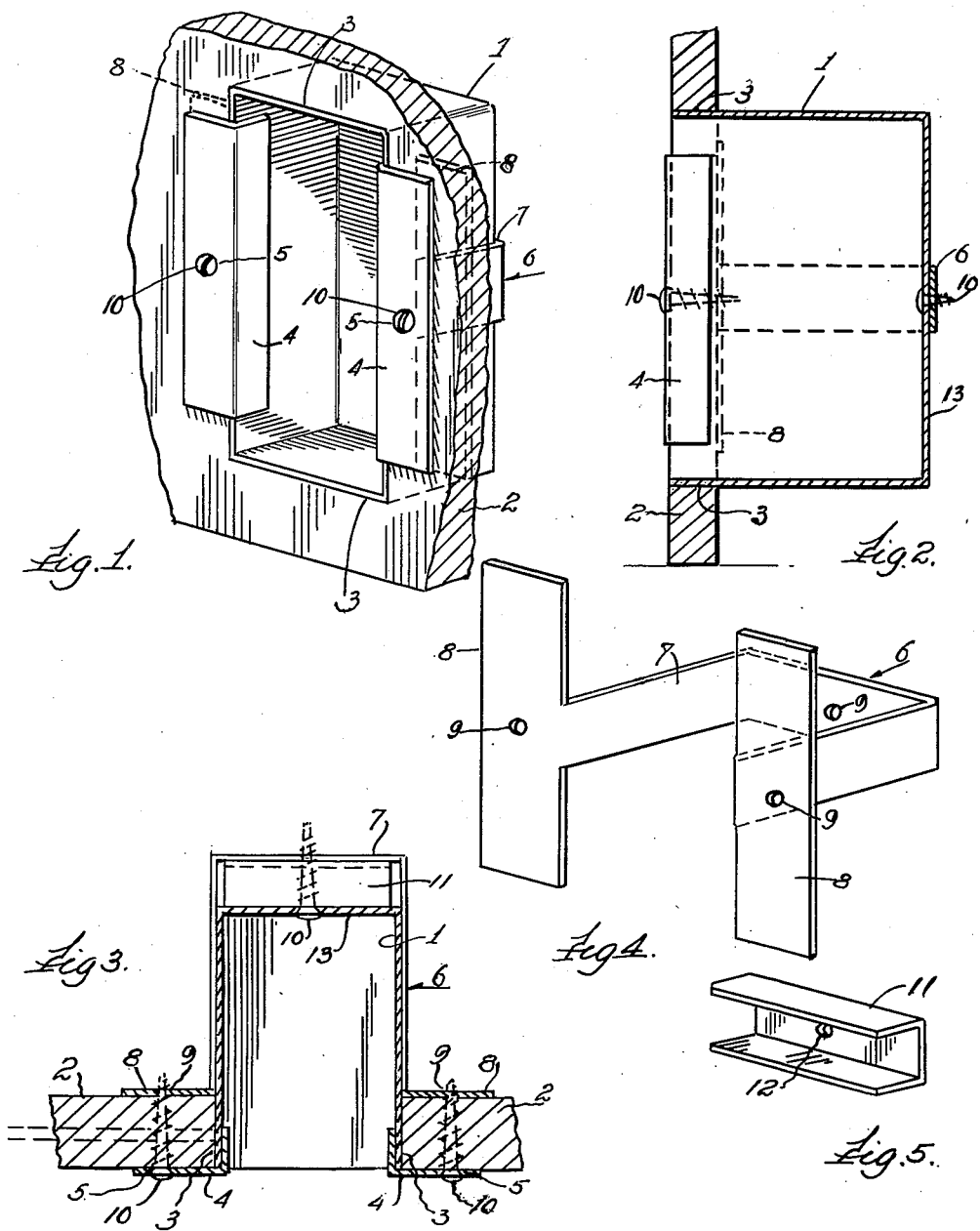

2,514,176

UNITED STATES PATENT OFFICE 2,514,176

ADAPTER FOR ELECTRICAL BOXES FOR WALL INSTALLATION

Alex N. Borkowski, Chicago Heights, Ill.

Application January 3, 1949, Serial No. 68,774

2 Claims. (Cl. 248—27)

This invention relates to electrical fittings, fixtures or appurtenances and more particularly to an electrical box adapter for installing electrical boxes in walls, ceilings, etc. of plaster board, rocklath and the like. One object is to provide a simple, practical electrical box adapter that is readily installed by almost anyone without the necessity of previous experience, that is adjustable to accommodate boxes of different sizes, that is safe in use, of sturdy construction, inexpensive to manufacture and compact in assembly.

Other objects and advantages of the invention will become apparent from the following description taken in connection with the accompanying drawing.

In the drawing:

Fig. 1 is a view partially in section and partially in elevational perspective showing the instant adapter in use, the screw fasteners being omitted.

Fig. 2 is a longitudinal vertical substantially central sectional view through Fig. 1 but showing the screws.

Fig. 3 is a cross sectional view through a slightly modified form of the adapter of Figs. 1 and 2.

Fig. 4 is a view in perspective of the strap member employed, and,

Fig. 5 is a perspective view of a spacer member employed with one form of adapter.

Like reference characters denote corresponding parts throughout the several views.

The reference numeral 1 denotes a standard type electrical box, shallow or deep, for installation in the wall 2 in wall perforation 3. A box strap hereinafter more fully described is inserted in the wall opening and the box then applied to this box strap and tightened in place, the adapter is then ready for use.

The adapter includes a pair of twin angle plates 4, the vertex of each plate angle being to one side of the longitudinal center line of the plate, the wider side of each plate formed at a point approximately midway between its terminals with a round threaded perforation 5, each plate being preferably of slightly less extent than the length of one of the longer sides of the wall box, each plate being applied to the forward or free edge of one of the box longer sides with the angle vertex thereagainst, the plate spaced approximately an equal distance from the ends of the box with the narrower side of each angle plate flat against a longer box side within the box and the wider sides of the angle plates extending away from each other outside the box.

A box strap 6 of a somewhat resilient metal or material includes an U-shaped portion 7 the sides of which remote from the base terminate in the twin elongated rectangular wings 8, the wings extending outwardly from the U portion 7, the sides of the U portion merging into or engaging the wings at their adjacent lateral edges at points equidistant from their ends, the wings disposed at right angles to the sides of the U. The wings and the base of the U portion are each formed at approximately their longitudinal centers with a threaded perforation 9.

Referring now to Figs. 1 and 2 the strap 6 is shown applied to the box closely thereabout. The size and shape of the wings 8 relative to the wider sides of the angle plates 4 is such that the wing perforations 9 may be disposed in line with the angle plate perforations 5 and the depth of the box is such that with the rear or bottom wall 13 of the box engaged by the base of the U portion 7 of the strap the wings will abut the wall 2 and the U base perforation 9 will align with the perforation in the wall 13 of the box.

Screws 10 are now inserted in the aligned perforations and the adapter members tightened in assembled position, this being done after the box with adapter members, except the angle plates, have been manually disposed in the wall opening, the strap 6 gripping the box. Referring now to Fig. 3 a shallow box is shown and the strap 6 when applied will extend rearwardly beyond the rear or bottom wall of the box. Here an elongated insert spacer 11, U-shaped in cross section, formed with a perforation 12 in its base is interposed with the perforation 12 in line with the box rear wall perforation and strap U-base perforation 9. Screws 10 of proper length and size are then applied, after the angle plates have been applied, and the assembly tightened.

What is claimed is:

1. In adapters for electrical boxes for wall installation, a pair of twin angle plates, the vertex of each angle plate being to one side of the longitudinal center line of the plate, the wider side of each plate formed at a point approximately midway between its terminals with a threaded perforation, each plate being of slightly less extent than the length of one of the longer sides of the wall box, said plates adapted for application to the longer sides of the wall box with their vertices upon the free edges of the box longer sides, an U-shaped box strap, twin rectangular wings at the box strap terminals at right angles thereto, said wings formed with threaded perforations in line with said angle plate perforations, the base of said box strap formed with a threaded perforation aligned with the wall box perforation, and screws connecting said aligned and in line perforations.

2. In adapters for electrical wall boxes for wall installation, a pair of twin angle plates, the vertex of each angle plate being to one side of the longitudinal center line of the plate, the wider side of each plate formed at a point approximately midway between its terminals with a threaded perforation, each plate being of less extent than the length of one of the longer sides of the wall box, said plates adapted for application to the longer sides of the wall box with their vertices upon the free edges of the box longer sides, an U-shaped box strap, twin rectangular wings at the box strap terminals, said wings formed with threaded perforations in line with said angle plate perforations, the base of said box strap formed with a threaded perforation in line with the wall box perforation, a perforate insert spacer between the wall box base and said box strap base with its perforation in line with that of the wall box and said box strap base, and screws connecting the perforations disposed in line with each other.

ALEX N. BORKOWSKI.

REFERENCES CITED

The following references are of record in the file of this patent:

UNITED STATES PATENTS

| Number | Name | Date |
| --- | --- | --- |
| 1,853,228 | Richardson | Apr. 12, 1932 |
| 2,044,650 | Thompson | June 16, 1936 |
| 2,297,862 | Bachmann | Oct. 6, 1942 |